United States Patent
Kitayama et al.

(10) Patent No.: US 9,476,654 B2
(45) Date of Patent: Oct. 25, 2016

(54) AIRCRAFT/SPACECRAFT FLUID COOLING SYSTEM AND AIRCRAFT/SPACECRAFT FLUID COOLING METHOD

(75) Inventors: Osamu Kitayama, Tokyo (JP); Keitaro Ishikawa, Tokyo (JP); Yorichika Mihara, Tokyo (JP); Taichi Aoyama, Tokyo (JP); Shinji Nishimura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 291 days.

(21) Appl. No.: 14/007,147

(22) PCT Filed: Mar. 21, 2012

(86) PCT No.: PCT/JP2012/057172
§ 371 (c)(1),
(2), (4) Date: Sep. 24, 2013

(87) PCT Pub. No.: WO2012/133041
PCT Pub. Date: Oct. 4, 2012

(65) Prior Publication Data
US 2014/0020872 A1   Jan. 23, 2014

(30) Foreign Application Priority Data
Mar. 31, 2011   (JP) .................................. 2011-081257

(51) Int. Cl.
*F28F 1/00* (2006.01)
*F02K 9/60* (2006.01)
(Continued)

(52) U.S. Cl.
CPC ................. *F28F 1/00* (2013.01); *B64G 1/402* (2013.01); *F02C 1/08* (2013.01); *F02C 7/16* (2013.01);
(Continued)

(58) Field of Classification Search
CPC .............. F02C 1/08; F02C 7/16; F02C 7/18; F02C 7/185; F02C 7/224; F02K 9/34; F02K 9/40; F02K 9/48; F02K 9/64; F02K 9/972; F02K 9/97
See application file for complete search history.

(56) References Cited

U.S. PATENT DOCUMENTS 3,028,729 A * 4/1962 Ledwith .................... F02K 9/46
                                                    60/259
4,089,370 A * 5/1978 Marchal .................. F28D 7/103
                                                    165/159
(Continued)

FOREIGN PATENT DOCUMENTS

DE    199 03 664    8/2000
GB        792909    4/1958
(Continued)

OTHER PUBLICATIONS

International Search Report issued Apr. 17, 2012 in International Application No. PCT/JP2012/057172.
(Continued)

*Primary Examiner* — Gerald L Sung
*Assistant Examiner* — William Breazeal
(74) *Attorney, Agent, or Firm* — Wenderoth, Lind & Ponack, L.L.P.

(57) ABSTRACT

An aircraft/spacecraft fluid cooling system and an aircraft/spacecraft fluid cooling method in which a fluid in a pipe installed in aircraft or spacecraft can be cooled efficiently so that the amount of fluid required for cooling the fluid can be reduced. A fluid cooling system includes a feed line that feeds a fluid from a storage tank to a pump, and a cooling section that expands a propellant having traveled through the pump, feeds the propellant to the outer periphery of the feed line so as to cool the propellant in the feed line, and discharges the expanded propellant outside.

20 Claims, 4 Drawing Sheets

(51) Int. Cl.

| | |
|---|---|
| *F28D 7/10* | (2006.01) |
| *F02K 9/46* | (2006.01) |
| *B64G 1/40* | (2006.01) |
| *F02K 9/34* | (2006.01) |
| *F02K 9/40* | (2006.01) |
| *F02K 9/48* | (2006.01) |
| *F02K 9/64* | (2006.01) |
| *F02K 9/97* | (2006.01) |
| *F02C 1/08* | (2006.01) |
| *F02C 7/16* | (2006.01) |
| *F02C 7/18* | (2006.01) |
| *F02C 7/224* | (2006.01) |

(52) U.S. Cl.
CPC ............... *F02C 7/18* (2013.01); *F02C 7/185* (2013.01); *F02C 7/224* (2013.01); *F02K 9/34* (2013.01); *F02K 9/40* (2013.01); *F02K 9/46* (2013.01); *F02K 9/48* (2013.01); *F02K 9/60* (2013.01); *F02K 9/64* (2013.01); *F02K 9/972* (2013.01); *F28D 7/106* (2013.01); *F05D 2260/20* (2013.01); *F28F 2265/26* (2013.01)

(56) References Cited

U.S. PATENT DOCUMENTS

| | | | |
|---|---|---|---|
| 4,096,616 A | 6/1978 | Coffinberry | |
| 4,707,982 A * | 11/1987 | Wagner | F02K 9/52 60/258 |
| 5,269,133 A | 12/1993 | Wallace | |
| 5,410,874 A * | 5/1995 | Limerick | F02K 9/48 60/259 |
| 5,551,230 A * | 9/1996 | Meng | F02K 9/46 60/259 |
| 6,052,987 A | 4/2000 | Dressler | |
| 6,536,208 B1 | 3/2003 | Kretschmer | |
| 7,216,477 B1 | 5/2007 | Erickson et al. | |
| 8,720,181 B1 * | 5/2014 | Kirshman | B64G 5/00 244/171.6 |
| 2001/0015063 A1 | 8/2001 | Maeding | |
| 2004/0026572 A1 * | 2/2004 | Burton | B64G 1/401 244/171.1 |
| 2008/0000217 A1 | 1/2008 | Erickson et al. | |
| 2008/0053064 A1 | 3/2008 | Erickson et al. | |
| 2010/0300065 A1 | 12/2010 | Balepin | |
| 2011/0005193 A1 * | 1/2011 | Pavia | F02K 9/64 60/206 |

FOREIGN PATENT DOCUMENTS

| | | |
|---|---|---|
| JP | 63-247558 | 10/1988 |
| JP | 1-142368 | 6/1989 |
| JP | 4-48184 | 2/1992 |
| JP | 5-306845 | 11/1993 |
| JP | 6-74584 | 3/1994 |
| JP | 6-347113 | 12/1994 |
| JP | 10-122763 | 5/1998 |
| JP | 11-229964 | 8/1999 |
| JP | 2001-193565 | 7/2001 |
| JP | 2002-538346 | 11/2002 |
| JP | 2003-278600 | 10/2003 |
| JP | 2006-343075 | 12/2006 |

OTHER PUBLICATIONS

Written Opinion of the International Searching Authority issued Apr. 17, 2012 in International Application No. PCT/JP2012/057172.
Bernard F. Kutter, et al., "Ongoing Launch Vehicle Innovation at United Launch Alliance", IEEE 2010-1020, Version 6, Updated Jan. 5, 2010, pp. 1-14.
Tsutomu Mizuno et al., "Development of Turbopump for LE-X Engine", IHI Engineering Review, vol. 43, No. 1, 2010, with English translation.
Extended European Search Report issued Dec. 11, 2014 in corresponding European patent application No. 12762853.5.

* cited by examiner

AIRCRAFT/SPACECRAFT FLUID COOLING SYSTEM AND AIRCRAFT/SPACECRAFT FLUID COOLING METHOD

TECHNICAL FIELD

The present invention relates to aircraft/spacecraft fluid cooling systems and aircraft/spacecraft fluid cooling methods for cooling fluids in pipes installed in aircraft or spacecraft.

BACKGROUND ART

Many liquid-propellant rockets use cryogenic fluids, such as liquid fuels, e.g. liquid hydrogen, and liquid oxygen, as propellants, and it is necessary to keep the propellant feed temperature and the device temperature required for engine ignition low.

A fluid cooling system 3 that maintains the propellant feed temperature in a liquid-propellant rocket will now be described with reference to FIG. 4. The fluid cooling system 3 is used in a second-stage rocket that carries an artificial satellite, etc. and travels by inertia around a planet while correcting its orbit.

When the second-stage rocket is traveling by inertia through outer space, a feed line 6 that feeds a propellant from a storage tank 4 to a pump 8, main lines 9 and 11 that feed the propellant from the pump 8 to an engine (not shown) connected to the main line 11, and an internal fluid increase in temperature due to heat input from the outside or from the pump 8. The fluid cooling system 3 discards the propellant to the outside (i.e., outer space) at regular intervals after the propellant has reached a saturation temperature or higher due to the heat input from the outside and accumulated in the feed line 6 and the main lines 9 and 11. By discarding the propellant outside, the interior of the feed line 6 and the main lines 9 and 11 is replaced with the low-temperature propellant from the storage tank 4.

In the case of the fluid cooling system 3 shown in FIG. 4, when the second-stage rocket is traveling by inertia without combusting the propellant in the engine, a main valve 10, a precooling valve 14, and a bearing precooling valve 16 are normally set in a closed state. When the propellant is to be replaced while the rocket is traveling by inertia, the precooling valve 14 and the bearing precooling valve 16 are opened so that the propellant accumulated in the feed line 6 and the main line 9 is discarded outside via an exhaust pipe 13 and an exhaust port 18.

Non Patent Literature 1 discloses a technology for precooling a fluid by discarding the fluid little by little and continuously replacing the fluid in the pipes.

CITATION LIST

Patent Literature

{PTL 1}
Japanese Unexamined Patent Application, Publication No. Hei 06-347113

Non Patent Literature

{NPL 1}
Bernard F. Kutter, Frank Zegler, Jon Barr, Mari Gravlee, Jake Szatkowski, Jeff Patton, Scott Ward, "Ongoing Launch Vehicle Innovation at United Launch Alliance", IEEE 2010-1020

Technical Problem

However, in the technology in the related art, the amount of propellant that needs to be discarded for precooling (i.e., the amount of wasted propellant not used for combustion) becomes excessive with increasing inertial traveling time. Therefore, the storage tank needs to contain enough propellant in view of the amount of wasted propellant. This leads to an increase in weight, thus becoming a hindrance to an improvement in the launching performance of the rocket.

SUMMARY OF INVENTION

The present invention has been made in view of such circumstances, and an object thereof is to provide an aircraft/spacecraft fluid cooling system and an aircraft/spacecraft fluid cooling method in which a fluid in a pipe installed in aircraft or spacecraft can be cooled efficiently so that the amount of fluid required for cooling the fluid can be reduced.

Solution to Problem

In order to solve the aforementioned problems, an aircraft/spacecraft fluid cooling system and an aircraft/spacecraft fluid cooling method according to the present invention employ the following solutions.

Specifically, an aircraft/spacecraft fluid cooling system according to a first aspect of the present invention includes a first feed pipe that feeds a fluid from a storage tank to a pump or a second feed pipe that feeds the fluid from the pump to a combustor; and a cooling section that expands the fluid having traveled through the pump, feeds the fluid to an outer periphery of at least one of the first feed pipe and the second feed pipe so as to cool the fluid in at least one of the first feed pipe and the second feed pipe, and discharges the expanded fluid outside.

According to the above aspect, the fluid is stored in the storage tank in, for example, a liquid state, and is fed from the storage tank to the pump via the first feed pipe or is fed from the pump to the combustor via the second feed pipe. The fluid is a liquid fuel, such as hydrogen or LNG, or liquid oxygen. In the cooling section, the fluid having traveled through the pump is reduced in temperature by being expanded, and the low-temperature fluid cools the fluid in at least one of the first feed pipe and the second feed pipe from the outer peripheral side of at least one of the first feed pipe and the second feed pipe. Subsequently, the expanded fluid is discharged outside.

Because the fluid in at least one of the first feed pipe and the second feed pipe is cooled by the cooling section, the fluid is maintained at low temperature. Therefore, before the combustor starts running and combusts the fluid, the fluid accumulated in at least one of the first feed pipe and the second feed pipe is prevented from reaching the saturation temperature or higher due to heat received from the outside. Furthermore, the fluid having traveled through the pump from the storage tank via the first feed pipe is fed to the cooling section. Thus, when the fluid is fed to the cooling section, the fluid in the first feed pipe and the pump is replaced with the fluid fed from the storage tank. Therefore, the first feed pipe and the pump can be cooled by the relatively low-temperature fluid fed from the storage tank. If the fluid used for cooling in the cooling section is in a two-phase gas-liquid state, the amount of heat exchange can be increased by utilizing latent heat of vaporization. Consequently, the fluid in the first feed pipe or the second feed pipe can be cooled efficiently. The pump is, for example, a turbo-pump.

In the above aspect, the cooling section may feed the fluid to the outer periphery of at least one of the first feed pipe and the second feed pipe along a longitudinal direction thereof.

According to this configuration, since the fluid fed to the outer periphery of at least one of the first feed pipe and the second feed pipe flows along the longitudinal direction of at least one of the first feed pipe and the second feed pipe, that is, along the pipe, the internal fluid can be cooled efficiently.

In the above aspect, the cooling section may form a double-walled pipe together with at least one of the first feed pipe and the second feed pipe. An inner pipe of the double-walled pipe may serve as the first feed pipe or the second feed pipe. The cooling section may make the fluid travel between an outer pipe and the inner pipe of the double-walled pipe.

According to this configuration, since the fluid in the first feed pipe or the second feed pipe serving as the inner pipe is cooled by the fluid traveling between the inner pipe and the outer pipe that surrounds the inner pipe, the contact area with the low-temperature fluid is large, whereby the temperature is efficiently reduced.

An aircraft/spacecraft fluid cooling method according to a second aspect of the present invention includes feeding a fluid from a storage tank to a pump through a first feed pipe that connects the storage tank and the pump; expanding the fluid having traveled through the pump; feeding the expanded fluid to at least one of an outer periphery of the first feed pipe and an outer periphery of a second feed pipe that connects the pump and a combustor; allowing the fluid fed to at least one of the outer periphery of the first feed pipe and the outer periphery of the second feed pipe to cool the fluid in at least one of the first feed pipe and the second feed pipe; and discharging the fluid fed to at least one of the outer periphery of the first feed pipe and the outer periphery of the second feed pipe and having cooled the fluid in at least one of the first feed pipe and the second feed pipe to the outside.

Advantageous Effects of Invention

According to the present invention, a fluid in a pipe installed in aircraft or spacecraft can be cooled efficiently so that the amount of fluid required for cooling the fluid can be reduced.

DESCRIPTION OF EMBODIMENTS

Embodiments according to the present invention will be described below with reference to the drawings.

First Embodiment

Figure 1:
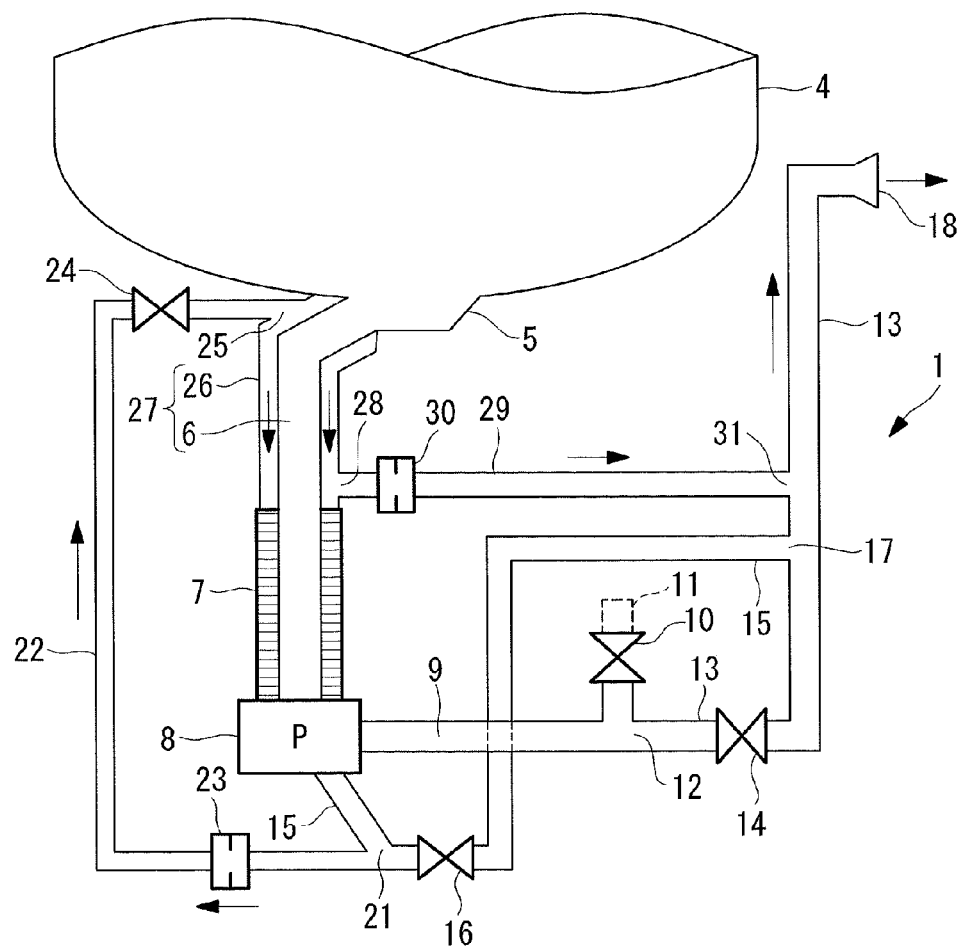
FIG. 1 is a piping diagram of a fluid cooling system according to a first embodiment of the present invention.

A fluid cooling system 1 according to a first embodiment of the present invention will be described below with reference to FIG. 1. The fluid cooling system 1 is used in a liquid-propellant rocket, specifically, a second-stage rocket that carries an artificial satellite, etc. and travels by inertia around a planet while correcting its orbit.

In the fluid cooling system 1, a cooling section 26 cools a feed line 6 so as to cool a propellant in the feed line 6. The propellant is an example of a fluid and is, for example, a liquid fuel, such as liquid hydrogen, or liquid oxygen. The propellant is used for combustion in an engine (not shown). The fluid cooling system 1 may be provided in each of two systems in the liquid-propellant rocket, that is, a liquid fuel system and a liquid oxygen system, or may be provided only in one of the systems. Providing the fluid cooling system 1 in the liquid oxygen system is more effective for reducing the amount of discarded propellant, to be described later, than if the fluid cooling system 1 is provided in the liquid fuel system since liquid oxygen has a higher molecular weight than a liquid fuel.

The two-stage rocket has a storage tank 4 that stores the propellant and a pump 8 that feeds the propellant to the engine. The pump 8 is, for example, a turbo-pump. The present invention is also applicable to an engine system that uses a pump other than a turbo-pump.

The feed line 6 is an example of a first feed pipe and connects an outlet 5 provided in the storage tank 4 to the pump 8. The feed line 6 feeds the propellant from the storage tank 4 to the pump 8. A bellows member 7, which is a bellows pipe, is used in a connection area between the feed line 6 and the pump 8. The bellows member 7 provides flexibility between the feed line 6 and the pump 8. The feed line 6 serves as an inner pipe of a double-walled pipe 27 between the outlet 5 and an inlet of the bellows member 7.

Main lines 9 and 11 are examples of second feed pipes and connect the pump 8 to the engine (i.e., a combustor) via a main valve 10. The main lines 9 and 11 feed the propellant from the pump 8 to the engine. The main line 9 is a pipe extending from the pump 8 to the main valve 10. The main line 11 is a pipe extending from the main valve 10 to the engine.

For correcting the orbit of the second-stage rocket, for example, the main valve 10 is opened when the propellant is to be combusted in the engine and is closed when the second-stage rocket is traveling by inertia and the propellant is not to be combusted in the engine.

The main line 9 is provided with a branch section 12, and an exhaust pipe 13 is connected to this branch section 12. The exhaust pipe 13 is provided with an exhaust port 18, and the propellant is discarded from this exhaust port 18. The exhaust pipe 13 is also provided with a precooling valve 14. The precooling valve 14 is normally in a closed state when combustion is being performed in the engine and also when the second-stage rocket is traveling by inertia. When the propellant saturated by heat input from the outside and accumulated in the main line 9 is to be discarded, the precooling valve 14 is opened.

The pump 8 is connected to a bearing precooling line 15. The bearing precooling line 15 connects the pump 8 to a merging section 17. The merging section 17 is a merging point between the bearing precooling line 15 and the exhaust pipe 13. The bearing precooling line 15 is provided with a bearing precooling valve 16. When the engine is stopped, the bearing precooling valve 16 is opened so that a bearing (not shown) provided in the pump 8 is cooled. The bearing is cooled by the propellant traveling through the bearing precooling line 15. After cooling the bearing, the propellant is discarded outside via the exhaust pipe 13 and the exhaust port 18. When combustion is being performed in the engine and when the bearing cooling process is not necessary, the bearing precooling valve 16 is closed.

The bearing precooling line 15 is provided with a branch section 21. A cooling-section inlet pipe 22 is connected to this branch section 21. The cooling-section inlet pipe 22 connects the branch section 21 to an outer-pipe inlet 25. The outer-pipe inlet 25 serves as an inlet of the cooling section 26 and is provided at the storage tank 4 side of the outer periphery of the feed line 6. Alternatively, the outer-pipe inlet 25 may be provided at the pump 8 side of the outer periphery of the feed line 6. The cooling-section inlet pipe 22 is provided with an upstream orifice 23 and an on-off valve 24. The on-off valve 24 is to be opened when allowing the propellant to travel to the cooling section 26, and is to be closed when not allowing the propellant to travel to the cooling section 26.

The cooling section 26 serves as an outer pipe of the double-walled pipe 27 and surrounds the outer periphery of the feed line 6 while being in contact with the feed line 6 serving as the inner pipe of the double-walled pipe 27. An outer-pipe outlet 28 serving as an outlet of the cooling section 26 is connected to a cooling-section outlet pipe 29. The outer-pipe outlet 28 is provided at the pump 8 side of the outer periphery of the feed line 6. Alternatively, if the outer-pipe inlet 25 is provided at the pump 8 side, the outer-pipe outlet 28 may be provided at the storage tank 4 side of the outer periphery of the feed line 6. The cooling-section outlet pipe 29 connects the outer-pipe outlet 28 to a merging section 31. The merging section 31 is a merging point between the cooling-section outlet pipe 29 and the exhaust pipe 13. The cooling-section outlet pipe 29 is provided with a downstream orifice 30. The cooling-section outlet pipe 29 discards the expanded propellant outside via the exhaust pipe 13 and the exhaust port 18.

The upstream orifice 23 and the downstream orifice 30 have individual flow-rate adjusting mechanisms such that, when the on-off valve 24 is open, the propellant is expanded by means of the Joule-Thomson effect occurring between the upstream orifice 23 and the downstream orifice 30. As a result, the propellant is reduced in temperature between the upstream orifice 23 and the downstream orifice 30 so that the low-temperature propellant traveling through the cooling section 26 cools the propellant in the feed line 6. The upstream orifice 23 and the downstream orifice 30 are, for example, fixed based on flow rates obtained by tests performed in advance. Alternatively, the upstream orifice 23 and the downstream orifice 30 may be adjustable such that the flow rate of propellant flowing through the cooling section 26 may be changed in accordance with the temperature.

The propellant fed to the cooling section 26 flows along the pipe-extending direction of the feed line 6 so that the propellant in the feed line 6 can be cooled efficiently. Furthermore, when the second-stage rocket is traveling by inertia, the propellant may be constantly and continuously fed to the cooling section 26 until the engine is ignited. Even if the propellant is constantly and continuously fed in this manner, the amount of discarded propellant can still be reduced due to the effect of expansion and temperature reduction, as compared with the method in the related art in which the propellant is periodically discarded and replaced.

Figure 2:
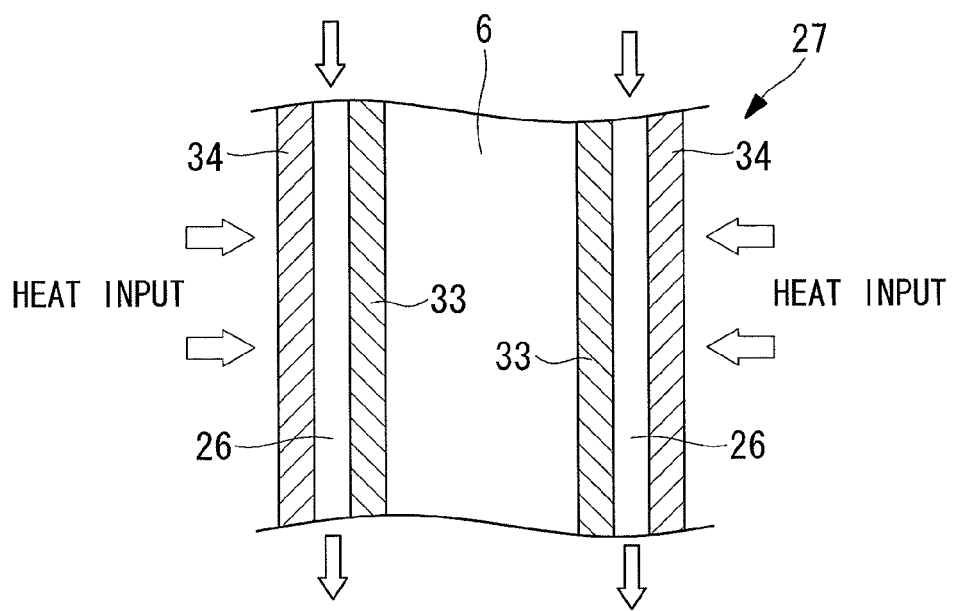
FIG. 2 is a partially enlarged cross-sectional view of a double-walled pipe.

The double-walled pipe 27 will now be described with reference to FIG. 2.

The double-walled pipe 27 is formed of an inner pipe 33 and an outer pipe 34. The interior of the inner pipe 33 serves as the feed line 6 through which the propellant flows from the storage tank 4 toward the pump 8. The cooling section 26 is provided between the outer pipe 34 and the inner pipe 33 and allows the expanded and temperature-reduced propellant to travel therethrough.

By making the low-temperature propellant travel through the cooling section 26, heat input from the outside via the outer pipe 34 is prevented from being transferred to the propellant traveling through the feed line 6. Moreover, the propellant traveling through the cooling section 26 cools the propellant traveling through the feed line 6 from the outer peripheral side of the inner pipe 33 so as to condense the saturated propellant.

With the double-walled pipe 27, the inner pipe 33 has a large contact area with the propellant traveling between the outer pipe 34 and the inner pipe 33 so that the temperature of the propellant in the inner pipe 33 can be efficiently reduced. The outer periphery of the inner pipe 33 may be provided with fins for facilitating heat transfer.

Because the propellant in the feed line 6 is cooled by the cooling section 26, the propellant is maintained at low temperature. Therefore, before the engine starts running and combusts the propellant, the propellant accumulated in the feed line 6 is prevented from reaching the saturation temperature or higher due to heat received from the outside. Furthermore, the propellant having traveled through the pump 8 from the storage tank 4 via the feed line 6 is fed to the cooling section 26. Thus, when the propellant is fed to the cooling section 26, the propellant in the feed line 6 and the pump 8 is replaced with the propellant fed from the storage tank 4. Therefore, the feed line 6 and the pump 8 can be cooled by the relatively low-temperature propellant fed from the storage tank 4.

If the propellant used for cooling in the cooling section 26 is in a two-phase gas-liquid state, boiling and forced convection occur within the cooling section 26. Since the amount of heat exchange can be increased by utilizing latent heat of vaporization of the propellant in the cooling section 26, the fluid in the feed line 6 can be cooled efficiently.

Second Embodiment

Figure 3:
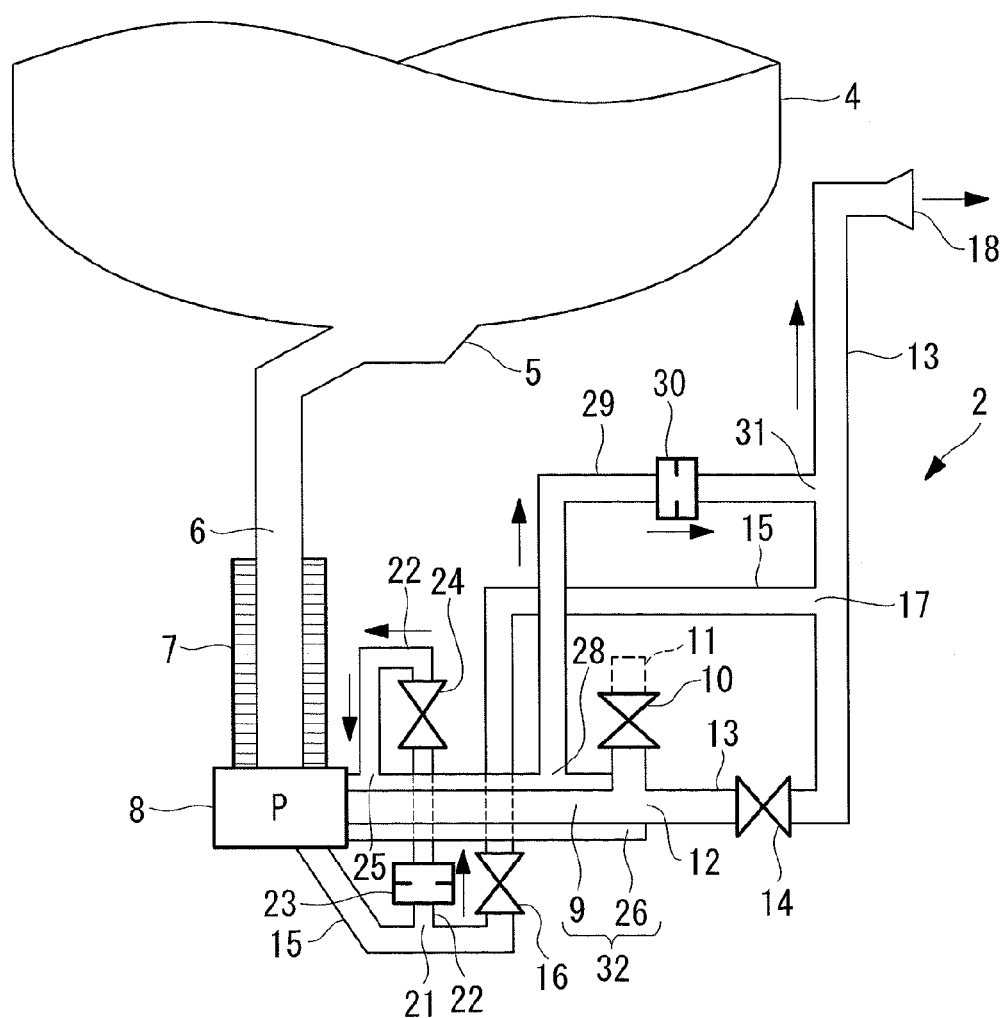
FIG. 3 is a piping diagram of a fluid cooling system according to a second embodiment of the present invention.
Figure 4:
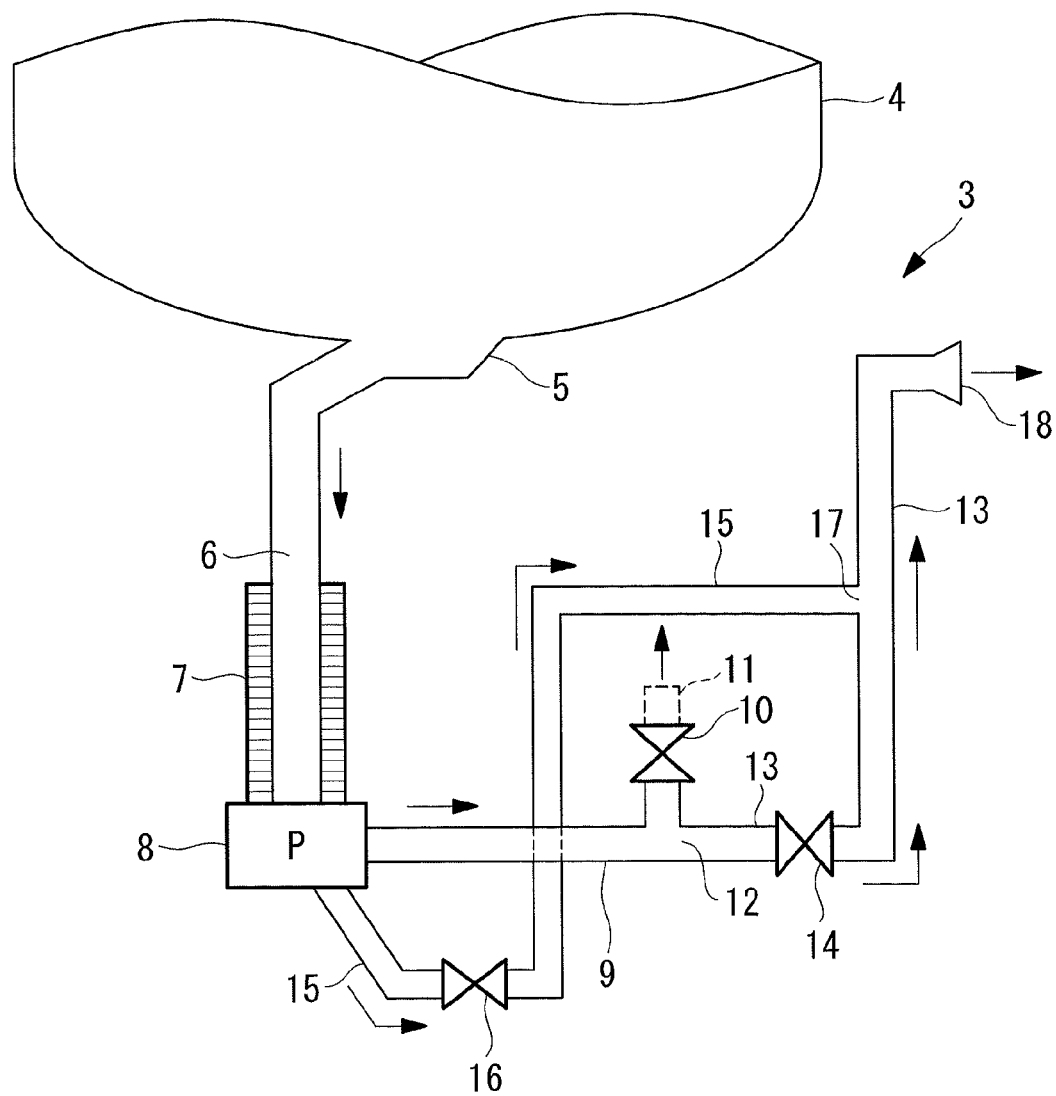
FIG. 4 is a piping diagram of a fluid cooling system in the related art.

Next, a fluid cooling system 2 according to a second embodiment of the present invention will be described with reference to FIG. 3. Descriptions of components that are the same as those in the first embodiment will be omitted.

Although the cooling section 26 is provided around the outer periphery of the feed line 6 in the first embodiment described above, the cooling section 26 is provided around the outer periphery of the main line 9 in the second embodiment. The main line 9 and the cooling section 26 constitute a double-walled pipe 32. The main line 9 serves as an inner pipe of the double-walled pipe 32.

The outer-pipe inlet 25 in this embodiment serves as an inlet of the cooling section 26 and is provided at the pump 8 side of the outer periphery of the main line 9. Alternatively, the outer-pipe inlet 25 may be provided at the engine side of the outer periphery of the main line 9. The cooling section 26 serves as an outer pipe of the double-walled pipe 32 and surrounds the outer periphery of the main line 9 while being in contact with the main line 9 serving as the inner pipe of the double-walled pipe 32. The outer-pipe outlet 28 is provided at the engine side of the outer periphery of the main line 9. Alternatively, if the outer-pipe inlet 25 is provided at the engine side, the outer-pipe outlet 28 may be provided at the pump 8 side of the outer periphery of the main line 9.

In this embodiment, the propellant is reduced in temperature between the upstream orifice 23 and the downstream orifice 30, and the low-temperature propellant traveling through the cooling section 26 cools the propellant in the main line 9.

The propellant fed to the cooling section 26 flows along the pipe-extending direction of the main line 9 so that the propellant in the main line 9 can be cooled efficiently.

Because the propellant in the main line 9 is cooled by the cooling section 26, the propellant is maintained at low temperature. Therefore, before the engine starts running and combusts the propellant, the propellant accumulated in the main line 9 is prevented from reaching the saturation temperature or higher due to heat received from the outside. Furthermore, the propellant having traveled through the pump 8 from the storage tank 4 via the feed line 6 is fed to the cooling section 26. Thus, when the propellant is fed to the cooling section 26, the propellant in the feed line 6 and the pump 8 is replaced with the propellant fed from the storage tank 4. Therefore, the feed line 6 and the pump 8 can be cooled by the relatively low-temperature propellant fed from the storage tank 4.

According to the first and second embodiments of the present invention, the propellant in the feed line 6 or the main line 9 can be cooled by expanding and reducing the temperature of the propellant. Moreover, the amount of discarded propellant can be reduced as compared with the method in the related art in which the propellant is periodically discarded and replaced. Depending on the system conditions, the amount of discarded propellant can be reduced to ⅓ or less.

Although the first and second embodiments are each directed to one of the systems described above, a system constituted of a combination of the first embodiment and the second embodiment is also possible in the present invention. Furthermore, objects to be cooled by expanding and reducing the temperature of the propellant or by replacing the propellant are not limited to the pump 8 and the propellant in the feed line 6 or the main line 9, and may include a component disposed near the outer pipe 34 of the double-walled pipe 27 or 32.

Although the above embodiments are directed to a second-stage rocket of a liquid-propellant rocket, the present invention is not limited to this example and may be applied to aircraft or spacecraft that performs combustion in the engine by using a cryogenic fluid, such as a liquid fuel or liquid oxygen. Furthermore, although the cooling section 26 is formed between the outer pipe 34 and the inner pipe 33 of the double-walled pipe 27 or 32 in each of the above embodiments, the present invention is not limited to this example. A configuration that does not use a double-walled pipe is permissible so long as the expanded and temperature-reduced propellant can transfer heat by coming into contact with the feed line 6 or the main line 9.

Furthermore, although the above embodiments are each directed to an example where the propellant is expanded and reduced in temperature by the Joule-Thomson effect, the propellant may be expanded and reduced in temperature by another technique so as to cool the propellant in the feed line 6 or the main line 9.

REFERENCE SIGNS LIST

1, 2, 3 fluid cooling system
4 storage tank
5 outlet
6 feed line (first feed pipe)
7 bellows member
8 pump
9, 11 main line (second feed pipe)
10 main valve
12 branch section
13 exhaust pipe
14 precooling valve
15 bearing precooling line
16 bearing precooling valve
17 merging section
18 exhaust port
21 branch section
22 cooling-section inlet pipe
23 upstream orifice
24 on-off valve
25 outer-pipe inlet
26 cooling section
27, 32 double-walled pipe
28 outer-pipe outlet
29 cooling-section outlet pipe
30 downstream orifice
31 merging section
33 inner pipe
34 outer pipe

The invention claimed is:

1. An aircraft/spacecraft fluid cooling system comprising:
a first feed pipe that feeds a fluid that is a cryogenic fluid from a storage tank to a pump, the cryogenic fluid from the storage tank being used for combustion in a combustor;
a second feed pipe that feeds the fluid from the pump to the combustor;
a cooling section that expands the fluid having traveled through the pump, feeds the fluid to an outer periphery of at least one of the first feed pipe and the second feed pipe so as to cool the fluid in at least one of the first feed pipe and the second feed pipe, and discharges the fluid that was expanded outside;
a cooling section inlet pipe that feeds the fluid from the pump to the cooling section; and
an on-off valve that is provided at the cooling section inlet pipe, the on-off valve being configured to be open in a state in which the fluid is allowed to travel to the cooling section, the on-off valve being configured to be closed in a state in which the fluid is not allowed to travel to the cooling section,
wherein the on-off valve is configured to be open before ignition of the combustor,
wherein the cooling section inlet pipe feeds the fluid to the cooling section before ignition of the combustor, and
wherein the cooling section discharges the fluid that was expanded outside before ignition of the combustor without supplying the fluid to the combustor.

2. The aircraft/spacecraft fluid cooling system according to claim 1, wherein the cooling section feeds the fluid to the outer periphery of the at least one of the first feed pipe and the second feed pipe along a longitudinal direction thereof.

3. The aircraft/spacecraft fluid cooling system according to claim 1, wherein the cooling section forms a double-walled pipe together with the at least one of the first feed pipe and the second feed pipe, wherein an inner pipe of the double-walled pipe serves as the first feed pipe or the second feed pipe, and wherein the cooling section makes the fluid travel between an outer pipe of the double-walled pipe and the inner pipe of the double-walled pipe.

4. The aircraft/spacecraft fluid cooling system according to claim 1, further comprising an exhaust pipe connected to the second feed pipe.

5. The aircraft/spacecraft fluid cooling system according to claim 4, further comprising a cooling section outlet pipe that feeds the fluid from the pump to the exhaust pipe.

6. The aircraft/spacecraft fluid cooling system according to claim 5, wherein the cooling section outlet pipe is provided with an orifice.

7. The aircraft/spacecraft fluid cooling system according to claim 4, further comprising a precooling valve, wherein the exhaust pipe is provided with the precooling valve.

8. The aircraft/spacecraft fluid cooling system according to claim 1, further comprising a main valve, wherein the second feed pipe extends from the pump to the main valve.

9. The aircraft/spacecraft fluid cooling system according to claim 8, further comprising a main line, wherein the main line extends from the main valve to the combustor.

10. The aircraft/spacecraft fluid cooling system according to claim 1, wherein the cooling section inlet pipe is provided with an orifice.

11. The aircraft/spacecraft fluid cooling system according to claim 1, further comprising a bellows member in a connection area between the first feed pipe and the pump.

12. An aircraft/spacecraft fluid cooling method for an aircraft/spacecraft fluid cooling system including a first feed pipe that feeds a fluid from a storage tank to a pump and a second feed pipe that feeds the fluid from the pump to a combustor, the method comprising:
    feeding the fluid that is a cryogenic fluid from the storage tank to the pump through the first feed pipe, the cryogenic fluid being used for combustion in the combustor;
    expanding the fluid having traveled through the pump;
    feeding the fluid that was expanded to at least one of an outer periphery of the first feed pipe and an outer periphery of the second feed pipe;
    allowing the fluid fed to the at least one of the outer periphery of the first feed pipe and the outer periphery of the second feed pipe to cool the fluid in at least one of the first feed pipe and the second feed pipe before ignition of the combustor; and
    discharging the fluid fed to the at least one of the outer periphery of the first feed pipe and the outer periphery of the second feed pipe outside without supplying the fluid to the combustor.

13. The aircraft/spacecraft fluid cooling method according to claim 12, wherein the aircraft/spacecraft fluid cooling system further includes an exhaust pipe connected to the second feed pipe.

14. The aircraft/spacecraft fluid cooling method according to claim 13, wherein the aircraft/spacecraft fluid cooling system further includes a cooling section outlet pipe that feeds the fluid from the pump to the exhaust pipe.

15. The aircraft/spacecraft fluid cooling method according to claim 14, wherein the cooling section outlet pipe is provided with an orifice.

16. The aircraft/spacecraft fluid cooling method according to claim 13, wherein the aircraft/spacecraft fluid cooling system further includes a precooling valve, and the exhaust pipe is provided with the precooling valve.

17. The aircraft/spacecraft fluid cooling method according to claim 12, wherein the aircraft/spacecraft fluid cooling system further includes a main valve, and the second feed pipe extends from the pump to the main valve.

18. The aircraft/spacecraft fluid cooling method according to claim 17, wherein the aircraft/spacecraft fluid cooling system further includes a main line, and the main line extends from the main valve to the combustor.

19. The aircraft/spacecraft fluid cooling method according to claim 12, wherein:
    the aircraft/spacecraft fluid cooling system further includes a cooling section inlet pipe and a cooling section,
    the cooling section inlet pipe feeds the fluid from the pump to the cooling section, and
    the cooling section inlet pipe is provided with an orifice.

20. The aircraft/spacecraft fluid cooling method according to claim 12, wherein the aircraft/spacecraft fluid cooling system further includes a bellows member in a connection area between the first feed pipe and the pump.

* * * * *